United States Patent [19]
Goto

[11] 3,740,126
[45] June 19, 1973

[54] PANORAMIC MOTION PICTURE CAMERA

[75] Inventor: Seizo Goto, Tokyo, Japan

[73] Assignee: Goto Optical Manufacturing Co., Ltd., Tokyo, Japan

[22] Filed: Sept. 3, 1970

[21] Appl. No.: 69,242

[30] Foreign Application Priority Data
Mar. 12, 1970 Japan................................. 45/20491

[52] U.S. Cl. ...................................... 352/69, 95/15
[51] Int. Cl. ............................................ G03b 37/00
[58] Field of Search ............... 352/69, 70, 71, 242, 352/243; 95/15, 16, 17, 18, 12.5, 86

[56] References Cited
UNITED STATES PATENTS

| | | | |
|---|---|---|---|
| 3,118,340 | 1/1964 | Iwerks | 352/70 |
| 2,942,516 | 6/1960 | Disney | 352/70 |
| 2,068,410 | 1/1937 | Hanke et al. | 352/69 |
| 1,735,109 | 11/1929 | Eliel | 95/18 R |
| 1,797,849 | 3/1931 | Aschenbrenner | 95/18 R |
| 2,828,664 | 4/1958 | Hoch | 352/70 X |
| 2,928,313 | 3/1960 | Hattori | 95/18 R X |
| 2,927,508 | 3/1960 | Hoch | 352/70 |
| 2,794,379 | 6/1957 | McNeil | 95/16 |

FOREIGN PATENTS OR APPLICATIONS
273,264  4/1930  Italy .................................. 352/69

*Primary Examiner*—Samuel S. Matthews
*Assistant Examiner*—Alan Mathews
*Attorney*—Robert E. Burns and Emmanuel J. Lobato

[57] ABSTRACT

This is a panoramic motion picture camera for taking panoramic pictures by means of a plurality of cameras disposed radially at equal intervals in a circle. For photographing the entire scene pano-hemispheric within at least 120° above the horizon by using wide-angle lenses a plurality of cameras (usually five cameras) are disposed with their optical axis inclined at an elevation angle of 2. The optical axis is bent 90° on a mirror so as to be led to a position higher by a distance corresponding to $\alpha$ than the center line of the film, and a finder comprising a wide-angle lens which permits the viewing of all the fields covered by the individual cameras is provided in the center thereof. The finder is used in combination with a vidicon camera connected electrically to a monitoring picture receiver.

5 Claims, 11 Drawing Figures

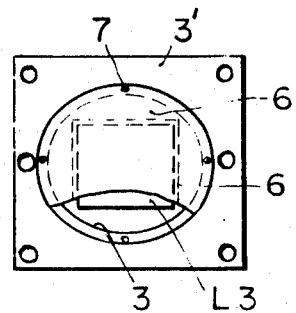
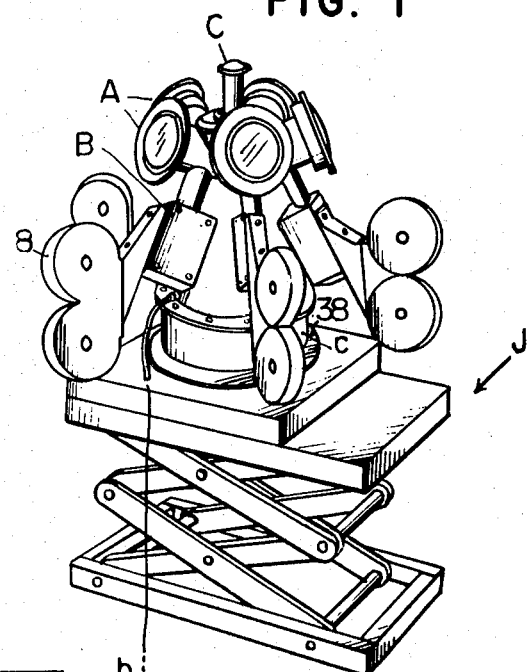
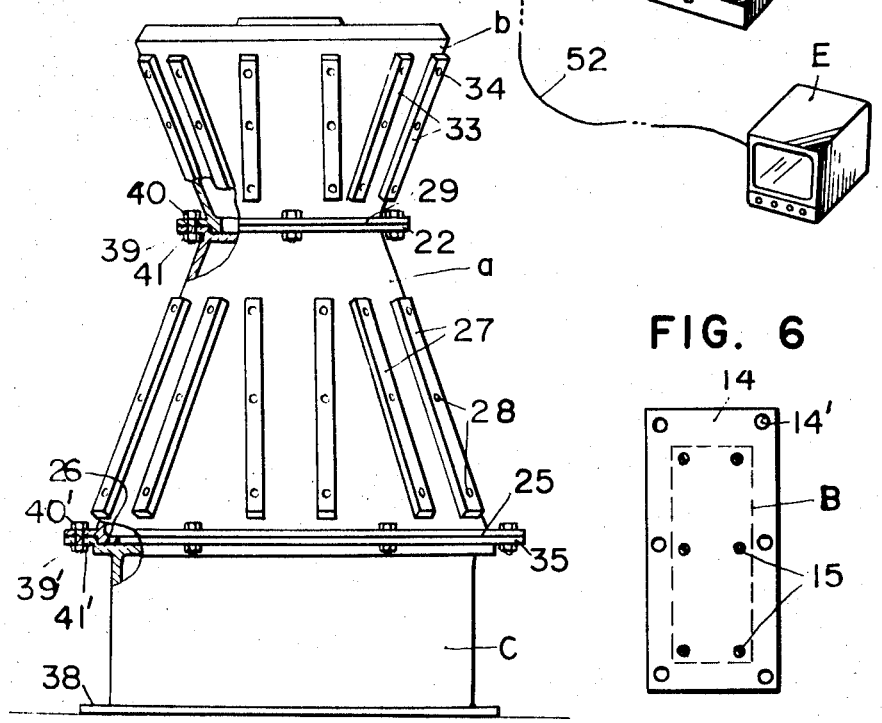
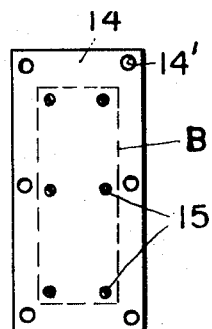

PANORAMIC MOTION PICTURE CAMERA

BACKGROUND OF THE INVENTION

This invention relates to a panoramic motion picture camera for taking the entire picture continuous and hemispheric within the range of 90° from the horizon to the zenith and 20° below the horizon by using a plurality of cameras.

Devices or methods for taking panoramic pictures by means of a plurality of cameras disposed radially and equidistantly in a circle have been disclosed, for example, in U. S. Pats. Nos. 649046, 1735109, 1797849, 2794379, 2927508, 2928313, 2,828,664, 2,068,410 and 2942516; French Pat. No. 385423; Italian Pat. No. 273,264 and German Pat. No. 1016033. U. S. Pat. No. 3118340 is publicly known as an invention for overlapping or preventing separation of adjoining fields covered by individual cameras. In this U. S. invention the optical axis of each of cameras is inclined at a certain angle with the axis of a partial field thereby covered with a reflecting means provided therefor, so that the effective optical axis of the camera may meet with the axis of the partial field. In relation to the angle between a true optical axis and the effective one, space between camera lenses and said reflecting means is determined so that these camera lenses may meet optically, substantially at the center of the circle. In this way partial fields covered precisely by individual cameras are projected substantially without any gap between individual pictures.

SUMMARY OF THE INVENTION

This invention is a novel and effective improvement in such publicly known techniques as above referred to. In conventional techniques for taking pano-hemispheric pictures by means of a plurality of cameras arranged equidistantly in a circle a photographic angle for scenes is limited to about 55°.

In accordance with this invention it is possible to photograph the entire scene continuous and hemispheric within the range of 90° from the horizon to the zenith and at least 20° below the horizon. The photographic angle is very large, and a technique for taking the entire continuous picture on a large scale properly by using a plurality of cameras is greatly improved.

In this invention a technique for letting nodal points of individual lenses meet is not applied optically or substantially for preventing any gap from appearing between adjoining partial fields covered by individual cameras. For taking pictures within such a large photographic angle the camera of this invention is so arranged that adjoining fields covered by individual cameras can be made properly continuous only when the camera lenses are set to their infinite distance, and are more overlapped in their nearer positions. Such a defect as overlapping on film of two adjoining fields is not eliminated in photographing, but is corrected by means of an aperture mask in a projector so as to be projected on a dome screen.

In accordance with this invention a plurality of (mainly five or three as the case may be) cameras with wide-angle lenses as required, each having the optical axis bent by 90° are used for taking the entire picture within the range of 90° from the horizon to the zenith and 20° below the horizon. Each lens optical axis is directed to an object at a required angle of elevation with the horizon, while the optical axis directed to the surface of film is positioned at a distance corresponding to $\alpha$; above the center line of the film. On the other hand a finder using a wide-angle lens, through which all the fields covered by the individual cameras can be looked at, is provided in the center of a circle in which they are disposed and is used in combination with a vidicon camera connected electrically to a monitoring picture receiver.

The entire picture continuous and hemispheric thus taken within 180° above and 20° below the horizon is projected on a dome screen as a pano-hemispheric motion picture on a very large scale, which may be useful for scientific study or entertainment.

A first object of this invention is to provide a camera assembly comprising a plurality of cameras each having the optical system employing a wide-angle (at least 120°) lens to cover a partial field of any object for taking its entire picture continuous and hemispheric within the range of 90° from the horizon to the zenith; and 20° below the horizon.

A second object of this invention is to provide a camera assembly in which the cameras are so arranged that the optical axis of each camera is inclined at an elevation angle of $\alpha$ with the horizon (at such an angle as to be about a half of the photographic angle of a camera lens) for taking a picture within 20° below the horizon in addition to that within the range of 90° from the horizon to the zenith the horizon.

A third object of this invention is to provide a camera assembly in which the optical system for each camera is bent by 90° with a mirror incorporated therein for preventing fields from being obstructed by any camera members in case the optical axis of each camera is inclined at an angle of elevation.

A fourth object of this invention is to provide a camera assembly comprising lens tubes and camera bodies separate therefrom which are mounted on mounting stands at their respective required angles, each of said lens tubes incorporating the optical system with said optical axis bent by 90° for the sake of economy by use of ready-made camera bodies.

A fifth object of this invention is to provide a camera assembly in which, for mounting said lens tubes and said camera bodies separately on two mounting stands, a plurality of mounting bosses are formed equidistantly at required angles on the surface of the mounting stands, which are so jointed that the mounting bosses form equal angles with the jointed face.

A sixth object of this invention is to provide a camera assembly in which lens tubes having a corner cut at 45° are mounted at the corner on mounting bosses via engaging means which permit adjustment of the height of such lens tubes.

A seventh object of this invention is to provide a camera assembly in which the lens optical axis is deviated to a point by a required distance above the center line of film for forming more images of the most lower part of any object consisting of fields covered by individual cameras, each being shaped like an isosceles triangle with two sides expanded a little outward between the vertex and the base.

An eighth object of this invention is to provide a camera assembly in which a finder employing a wide-angle lens to permit the looking of all the fields covered by individual cameras is mounted over the center of the camera arrangement.

A ninth object of this invention is to provide a camera assembly in which for finding which field is covered by which camera when the finder with a wide-angle lens is used, a field glass is provided in the light path of the finder, said field glass having the surface with division lines dividing fields covered by individual cameras and camera numbers corresponding thereto.

A tenth object of this invention is to provide a camera assembly in which a finder is used in combination with a vidicon camera, which may be connected to a monitoring picture receiver for enabling a person to look through the camera finder at any dangerous place such as on a plane or at a remote point.

These objects and other features of this invention will be better understood from the following description with reference to the accompanying drawings.

BRIEF DESCRIPTION OF THE DRAWING

FIG. 1 is a pictorial view of a camera assembly mounted on a lift in accordance with this invention;

FIG. 4 is a side view of the mounting stands and a box partly cut out for housing a motor, which is jointed thereto;

FIG. 5 is a back view of a lens tube having a mirror mounted on the corner formed by cutting one end portion of the lens tube;

FIG. 6 is a back view of the camera body viewed from a mounting plate therefor;

DESCRIPTION OF THE PREFERRED EMBODIMENTS

Figure 2:
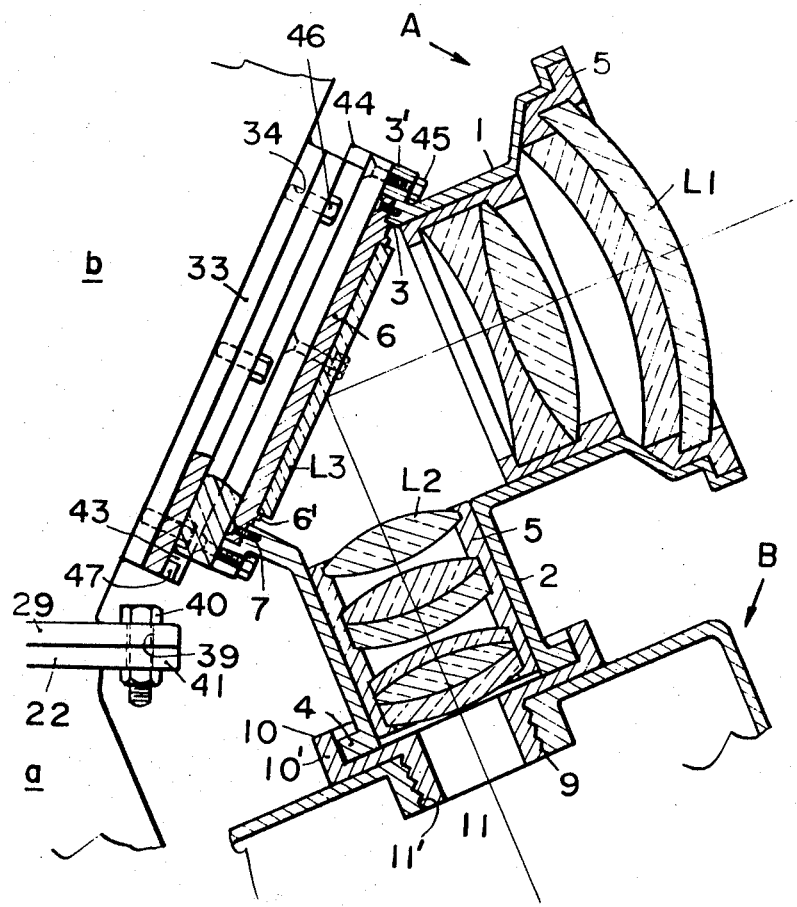
FIG. 2 is a cross-sectional view of a lens tube and a mounting means thereof.
Figure 3:
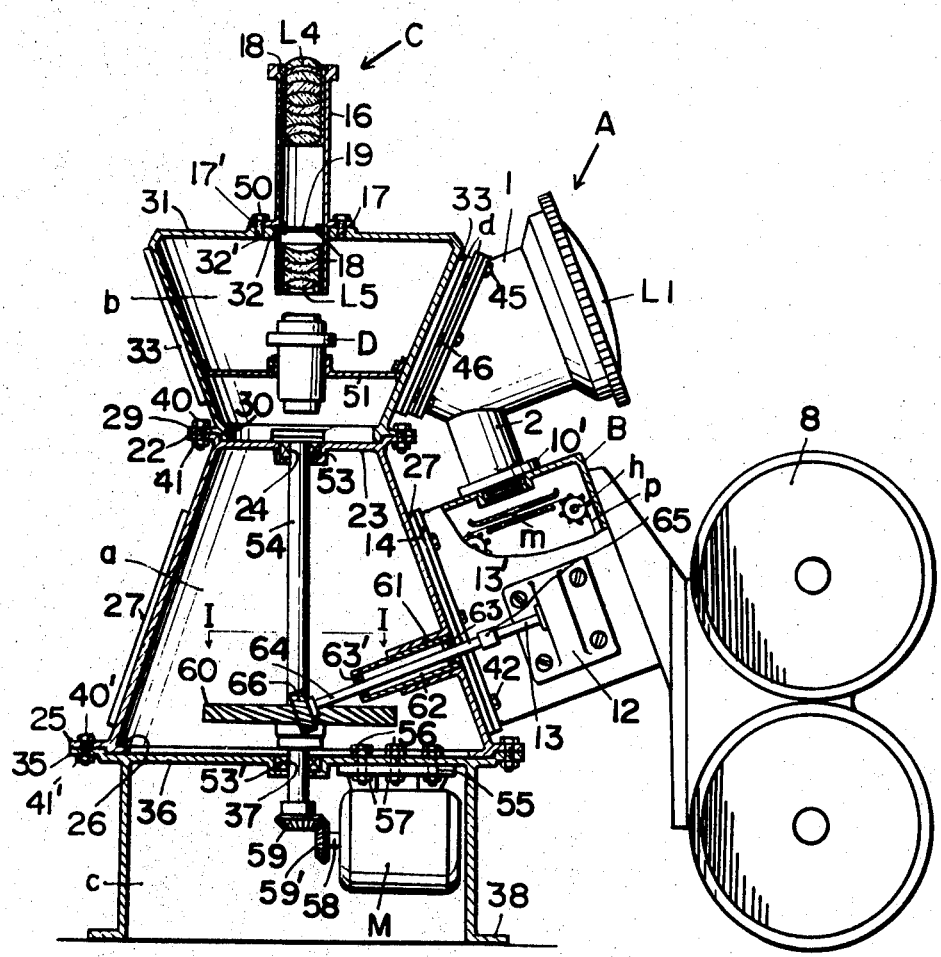
FIG. 3 is a cross-sectional view of mounting stands with the lens tube and a camera body provided and part of a driving mechanism.

FIGS. 1 to 3 show a preferred embodiment of this invention in which five cameras are used.

As shown in FIG. 2, a lens tube, which is cast in any suitable light alloy, consists of a tube 1 for combined objectives L1, a tube 2 for rear combined lenses L2 arranged at a right angle thereto, and a mirror L3 for bending the optical axis, which is mounted in an elliptic window 3 formed by cutting the corner of the tube 1 at 45°, so that a light path may be led to a camera body B by bending the optical axis at 90° on the mirror.

The periphery of the opening of this window 3 is formed into a stepped boss 3' so wide as to permit the mounting of a dovetail means to be described subsequently. The rear tube 2 of the lens tube A has a flange 4 formed integrally therewith at the lower end.

The optical system described above employs a fisheye lens having a photographic angle of 140° for equidistant projection. The combined objectives L1 composed of four lenses and the rear combined lenses L2 composed of six lenses are of a retrofocus type with a focal length of 19.3 mm, F = 3.5. Any incident ray is reflected on the mirror L3 for bending the optical axis at 90° thereto so as to be led to the rear combined lenses L2. These combined lenses L1 and L2 are set optically in the lens tube A by means of a metal frame 5. This mirror L3 is such as commonly known, which has a reflecting layer formed by mercury plating on the back and is supported at the edge of the mirror with a frame 6' formed on the surface of a metal plate 6 as large as to cover the window 3.

The metal plate 6 with the mirror 3 mounted thereon is then set optically in a proper manner for the bending of the optical axis of the combined objectives L1 and the rear combined lenses L2 and is fixed by such normal means as machine screws 7 on the stepped edge of the window 3 (see FIG. 5).

As shown in FIG. 3, a camera body B is such as conventionally known or ready-made, which is used with a film take-up means 8 put downward and a lens mounting opening 9 upward.

Figure 10:
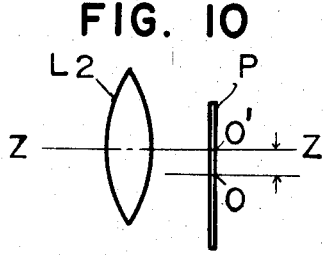
FIG. 10 is a view explanatory of a distance between the centers of the optical axis and film.

In the lens mounting opening 9 is set a ring 10' by screwing the ring with a thread 11' into the opening 9 with a thread 11, said ring having the periphery so formed as to receive a flange 4 formed on the lens tube A. The ring 10' for the lens tube A, as shown in FIG. 10, is so fixed that the optical axis Z — Z of the optical system L1, L2, and L3 may be deviated to a point 0' 4 mm above the center point 0 of eight-perforation 36 mm film P in the camera body B, which is driven to an aperture mask (m) by means of sprocket wheels (h) and the film take-up means 8 not shown in detail.

A gear box 12 for transmitting driving power interrelatedly to the film is provided in such a manner as to protrude inward from one side of the camera body B. From this gear box 12 extends a driving shaft 13 in alignment therewith or in the direction of the mounting of the camera body B.

A mounting plate 14 is fixed by such normal means as machine screws 15 on the wall of the camera body B so as to be mounted on a mounting stand to be described later (see FIG. 6).

A finder C for looking at all fields covered by individual cameras has a mounting flange 17 formed integrally therewith suitably on a lens tube 16, which is cast in any light alloy. The lens tube 16 is provided at the upper end with a fisheye lens of a photographic angle of 220°, which is composed of nine lenses with a focal length of 6.2 mm, F = 5.6 for equidistant projection.

Figure 8:
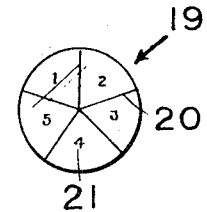
FIG. 8 is a plan view of a field glass for a finder.

Such combined lenses L4 are set optically in the lens tube 16 together with a field glass 19 under the lower end thereof by means of a metal frame 18. This field glass 19 has division lines 20 to divide equally into five sectors, which are covered by five cameras respectively, each being given a camera number corresponding thereto (see FIG. 8).

Under this field glass 19 is optically set relay combined lenses L5 by means of the metal frame 18. The combined relay lenses L5 are used to reduce an image formed by the upper combined lenses L4 so that the entire image may be received on the image tube in a vidicon camera D, which is connected to the finder C.

A mounting stand (a) constructed as shown in FIG. 4 will be explained, on which said lens tube A, camera body B, finder C, and vidicon camera D are mounted.

The mounting stand (a) for mounting five cameras is shaped like a truncated cone made of cast iron with an interior angle of 70° and being hollow with the upper and lower flanges 22 and 25 formed therewith. The inner periphery of the flange 22 on the upper narrower end is stepped and formed integrally with the upper lid 23. The upper lid 23 has a center hole 24 with the edge made thicker or formed like a boss, while the lower flange 25 has the inner periphery formed outward as an engaging edge.

On the slant surface of the mounting stand ($a$) are formed integrally five pairs of strips with mounting bosses 27, 27 in five equidistant positions. The strip surface with the mounting bosses 27, 27 is finished precisely so as to form an angle of 66°30' with the bottom face of the mounting stand ($a$) and has a tapped hole 28 as required.

A mounting stand ($b$) for the lens tube A is similar in shape to the mounting stand ($a$) for said camera body B. On the narrower end of the mounting stand ($b$) is formed integrally a flange 29 so as to be jointed to the narrower end of the mounting stand ($a$). The inner periphery of the flange 29 is used as an engaging edge 30, which is formed outward so as to be engaged with the inner periphery of the flange 22 of the mounting stand ($a$).

On the upper end of the mounting stand ($b$) the upper lid 31 is formed integrally therewith, which has a center hole 32 with the edge made thicker or formed like a boss. On the slant surface of the mounting stand ($b$) are provided five pairs of mounting bosses 33, 33 in five equidistant positions (corresponding to those of the mounting bosses 33, 33 formed on the camera body B), which has the surface finished precisely so as to form an angle of 66°30' with the bottom face of the mounting stand ($b$), and has tapped holes 34 as many as required.

To the bottom of the mounting stand ($a$) is jointed with the engaging edge 30 set in the inner stepped portion of the flange 22 and are fastened firmly by nuts 41 and bolts 40 inserted through meeting holes 39 on the flanges 22 and 29.

The mounting stand ($a$) is jointed at the lower end to the box ($c$) for housing the motor with the engaging edge 26 set in the inner stepped portion 35 of the box ($c$) by tightening nuts 41' on bolts 40' inserted into holes 39' meeting on the flanges 25 and 35.

Then, five camera bodies B are mounted on the mounting stand ($a$) at equal intervals by tightening set screws 42 in the tapped holes 28 on the mounting bosses 27, 27 on the stand ($a$) and through the holes 14' on the mounting plate 14 meeting therewith.

Figure 7:
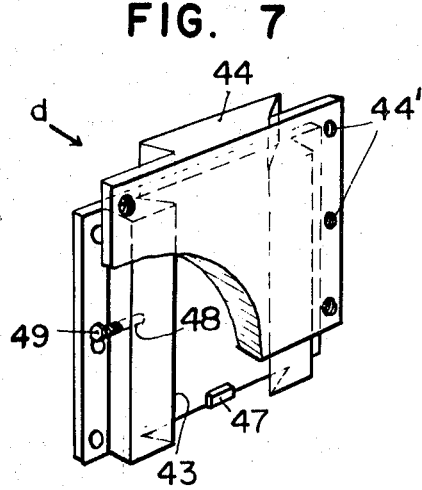
FIG. 7 is a pictorial view of a dovetail means partly cut out for combining the lens tube with the mounting stand.

The lens tube A is mounted with the optical axis inclined at 23°30' an angle of elevation with the horizon. In this case the lens tube A is jointed at the corner cut at 45° to a dovetail means ($d$) normally by tightening set screws 45 into holes 44' made on the base of a dovetail member 44 and into tapped holes on the boss 3' of the lens tube A, said dovetail means being composed of the dovetail member 44 and a groove member 43 engaged therewith, as shown in FIG. 7. The base of the groove member 43 is fixed on the mounting bosses 33, 33 by tightening set screws 46 into holes 43' and tapped holes 34 meeting therewith.

The dovetail member 44 is inserted into the groove member 43 until it reaches a stopper 47 provided at the lower end of the groove member 43. Each of the lens tubes A is adjusted for a fixed height or so that the optical axis may be brought to the same level. After such adjustment the dovetail member 44 is fixed at the side where a set screw 49 is tightened into a tapped hole 48 passing through the groove member from the outer side so as to press against the dovetail member.

Figure 11:
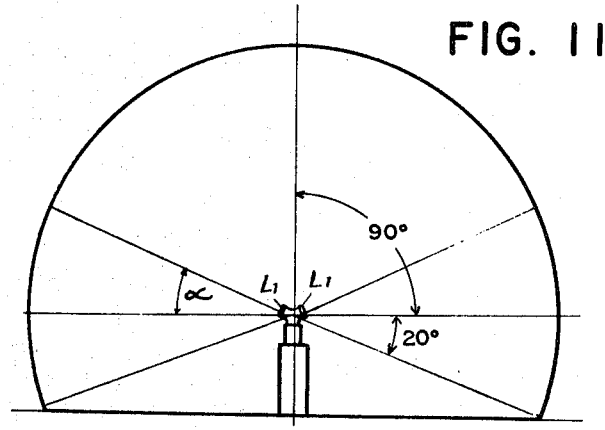
FIG. 11 is a view explanatory of fields covered by five cameras for the entire hemispheric picture within an angle of 180° and 20° under the horizon.

The surface of the mounting bosses 27, 27 and 33, 33 on the upper and lower mounting stands ($a$) and ($b$) is finished precisely at 66°33' with the base, while the lens tube A is mounted at the corner cut at 45° with the camera body B mounted properly on the mounting plate 14. Consequently the optical axis of the lens tube A is directed to any object precisely at 23°30', an angle of elevation, and each of the cameras covers its photographic angle as shown in FIG. 11.

The ring 10' on the camera body B is engaged with the flange 4 on the rear tube 2 of the lens tube A in such a manner that the lens optical axis $Z - Z$ is deviated by 4 mm above the center line point 0 of the film, as already mentioned.

The finder ($c$) is supported by the flange 17 formed suitably on the lens tube 16 and put on the center hole 32 on the upper lid 31 of the upper mounting stand ($b$) with the lower part kept therein, and is fixed by tightening the set screws 50 into holes 17' on the flange 17 and the tapped holes 32' on the boss formed around the hole 32 on the upper lid 31.

The image tube used as the vidicon camera D is provided right under the relay combined lenses L5 and is fixed by machine screws on a board 51 mounted on the inner wall of the mounting stand ($b$) by means of bolts.

The vidicon camera D is connected electrically to a monitoring picture receiver E with a cord 52, where fields covered by the individual cameras, which are seen through wide-angle (220°) combined lenses, are shown with the division lines 20 and the camera numbers 21 on the field glass 19 indicating their directions.

Figure 9:
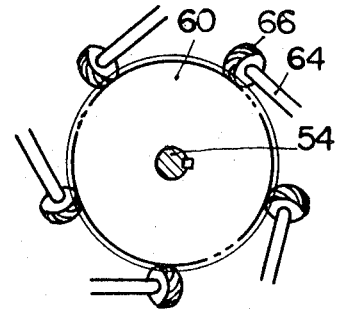
FIG. 9 is a cross-sectional view taken along a line I — I in FIG. 3, showing a mechanism for interconnecting individual cameras.

As shown in FIG. 3 and 9, films in the five cameras must be controlled for their synchronized operation, for which a driving mechanism not novel but common is employed. The mechanism will be explained briefly in relation to this invention.

A ball bearing 53 is fixed in the hole 24 with the edge made thicker or formed like a boss on the upper lid 23 of the mounting stand ($a$), and a ball bearing 53' is mounted likewise in the hole 37 with the edge formed like a boss on the upper lid 36 of the box C in opposition to the ball bearing 53. On these ball bearings 53 and 53' is supported a main shaft 54, which has the lower end portion extending into the box C. A 800 W d-c servo-motor M is mounted upside-down on the upper lid 36 of the box C by tightening nuts 57 on bolts 56 inserted into mounting holes 55 and holes meeting on the upper lid 36. A shaft 58 of the motor M and the main shaft 54 are so arranged as to cross at a right angle and be driven by means of bevel gears 59 and 59' in mesh. A screw gear is mounted suitably on the main shaft 54 in a common way.

Then a shaft 13 extending from the gear box 12 in the camera body B to the mounting stand ($a$) is connected to the one end of a shaft 64 by means of a joint 65, said shaft 64 being inserted through ball bearings 63 and 63' fixed in a bearing means, which consists of a long pipe 62 and said ball bearings 63 and 63', and is inserted through a hole 61 with the edge formed like a boss on the inner surface of the mounting stand ($a$). The other end of this shaft 64 is jointed to a screw gear 66, which is engaged with the screw gear 60. In this manner the mechanism for synchronized driving is constructed, in which other screw gears 66 on other shafts 64 jointed to the shafts 13 in other camera bodies B arranged in mesh equidistantly on the periphery of the screw gear 60 can be driven in synchronization, as the main shaft 54 rotates. Thus the films in the individual cameras are run and stopped in synchronization.

The panoramic motion picture camera thus constructed is practically mounted on a lift J, which is controlled by means of a hydraulic mechanism for rotating, inclining, and moving up and down the camera device with the flange 38 fixed on the lower end of the box C for housing the motor M. It is easy to carry the camera arrangement on any transport vehicle.

Now the principle of this invention must be clearly understood from the above detailed explanation. In this embodiment the optical system is separated from the camera body. With the same object of this invention, however, the optical system may be incorporated in the camera body. Such modification is merely a change in design.

It is therefore to be noted that other modifications, elimination, or addition may be easily made without departing the scope and the spirit of this invention.

What is claimed is:

1. A panoramic motion picture camera, comprising a plurality of cameras disposed equidistantly in a circle for taking panohemispheric pictures, each of the cameras having an optical system including wide-angle lenses with a photographic angle wide enough to cover each separate field so that the entire scene around thereof may be photographed as a continuous scene within the range of 90° from the horizon to the zenith and 20° below the horizon, means mounting each camera so as to have the optical axis thereof inclined at a required elevation angle with respect to its field to be photographed for viewing thereof, said optical system further including a mirror provided for bending the optical axis by 90° so that any incident ray may be reflected and directed to the surface of a film, a camera body within which said film is advanced; and a finder provided in the center of the cameras and having a wide angle lens of a photographic angle to cover all the fields covered by the individual camera, a vidicon camera used in operation in combination with said finder, and means for connecting said vidicon camera to a monitoring picture receiver.

2. A panoramic motion picture camera as set forth in claim 1, wherein the optical axis of each camera optical system is diverted upwardly from the center line of the film by a given distance.

3. A panoramic motion picture camera as set forth in claim 1, wherein said finder comprises a field glass mounted optically in a light path thereof, said field glass having division lines and camera numbers corresponding to the fields covered by the individual cameras.

4. A panoramic motion picture camera as set forth in claim 1, comprising two mounting stands for mounting the optical system and the camera body separately, each of said mounting stand having a configuration corresponding to a truncated cone and having a plurality of mounting bosses mounted equidistantly at an angle on slant surfaces thereof, means joining said mounting stands at their narrower ends with the surface of the mounting bosses so arranged as to form the same angle with a plane disposed at the joint.

5. A panoramic motion picture camera as set forth in claim 1, comprising lens tubes each including said reflective optical system and having a surface cut at 45° outside its reflective corner, means adjustably mounting said lens tubes at the cut surface thereof on one of said mounting stands.

* * * * *